April 20, 1965 P. PATIN 3,179,238
CONVEYOR BELT INSTALLATION
Filed Jan. 22, 1963

United States Patent Office 3,179,238
Patented Apr. 20, 1965

3,179,238
CONVEYOR BELT INSTALLATION
Pierre Patin, Paris, France, assignor to Compagnie d'Ingenieurs et Techniciens d'Etudes—C.I.T.E.—, Paris, France, a company of France
Filed Jan. 22, 1963, Ser. No. 253,116
Claims priority, application France, Feb. 2, 1962, 886,798
1 Claim. (Cl. 198—181)

This invention relates to a conveyor belt installation for various materials, the installation also being usable as an escalator for the transport of people.

In known conveyor belt installations, the driving motors are situated at the ends or one end of the belt.

The length of the belt is then limited by the maximum traction it can withstand. These limited lengths therefore make it necessary to break the continuity of the belt, and this is a disadvantage, particularly if the belts are used for the transportation of fragile materials or of people.

The invention obviates these disadvantages and provides a conveyor belt installation comprising a flexible belt, carrying rollers and driving rollers, in which the belt is provided with stiffeners extending obliquely with respect to the belt length, the distance between two successive rollers being less than the length of the belt over which a stiffener extends.

Other features of the invention will be apparent from the more detailed description hereinbelow with reference to embodiments given by way of example and illustrated in the accompanying drawings wherein.

The installation shown on the drawings comprises a flexible belt 1, for example of neoprene, or any other material having similar physical properties, particularly as regards strength and elasticity.

The belt 1 may be longitudinally reinforced by threads of a strength sufficient to increase the tensile strength of the belt, these threads being, however, capable of an elongation compatible with that of the belt in order to facilitate turns and loops.

The belt 1 moves over carrying rollers 2 and is driven by driving rollers 3 distributed over the length of the belt and between which are disposed the supporting rollers.

The spacing of the driving rollers is governed by the maximum tension that the belt can withstand and by the economic balancing of the number of motors and their power against the strength of the belt.

The motors and their supply must be such that the power that they deliver is dependent upon the belt tension at a substantially constant speed, this power being greater than the power producing a given initial operating tension.

The tension may differ from one section separating two motors to another section, and it must be such that in a turn or loop the inner edge of the belt 1 retains a positive tension although less than the operative tension and there is no risk that the belt— which is suitably guided and held at its edges—will crease, since the elongation required at the outer edges at the turn is contained in the material making up the belt.

Figure 3:
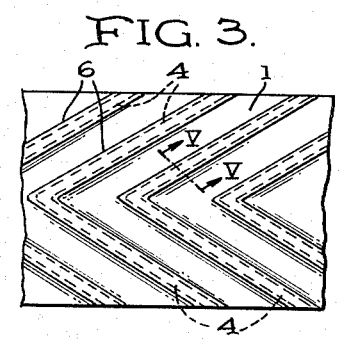
FIGURE 3 is a bottom plan view of part of the flexible belt according to the invention, to a larger scale.
Figure 4:
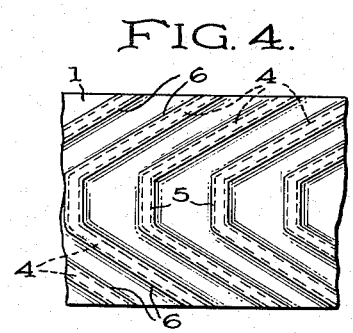
FIGURE 4 is a similar view to FIGURE 3, showing an alternative embodiment.

The belt 1 is provided with transverse stiffeners 4. These stiffeners may be in the form of chevrons as shown in FIGURE 3, or in the form of chevrons cut off at 5 as shown in FIGURE 4.

Each stiffener may be formed by a reinforcement of a harder and stronger material than the belt, and be either embedded in a beading 6 in the belt, of which it then forms an integral part, or be fixed to the surface of the belt.

The stiffeners, particularly in the form of chevrons, form sufficiently rigid rack teeth to enable the belt to be driven by engagement with the driving rollers, the latter being toothed, the shape of the teeth corresponding to the shape of the stiffeners.

The driving rollers 3 are separated by a series of supporting rollers 2 which support the belt 1. These supporting rollers are sufficiently close for each stiffener 4 to be resting on at least two rollers at any time, so as to ensure continuous support of the stiffeners and limit the vertical vibrations which might be a nuisance, particularly to passengers on an escalator.

Figure 1:
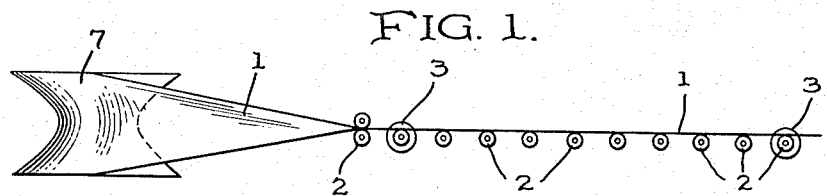
FIGURE 1 is a side view of an installation according to the invention.
Figure 2:
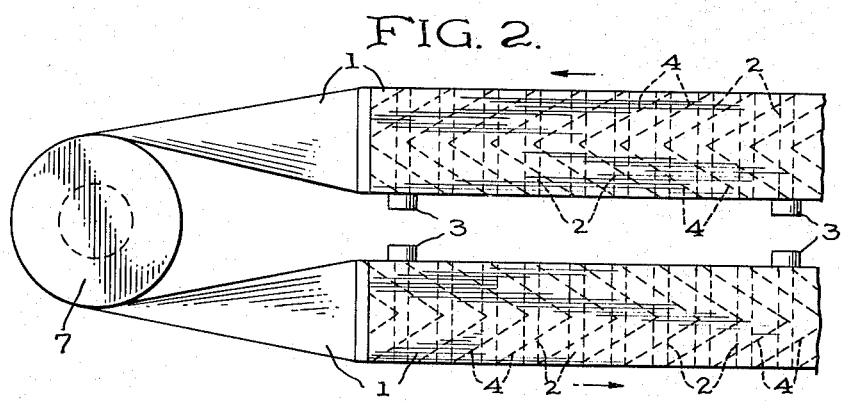
FIGURE 2 is a plan view of the installation shown in FIGURE 1.

When the stiffeners are formed by rectilinear parts, and particularly chevrons, they may roll on a regular surface. For example, in the case of chevrons, it is possible to use rollers in the form of a hyperboloid of revolution 7 as shown in FIGURE 1.

Thus, the same belt 1 can be used for the outgoing and return run over any distance by turning the belt 1 over (FIGURE 1) without any loss of space and while using the same level for the outgoing and return run of the belt.

Figures 5, 6:
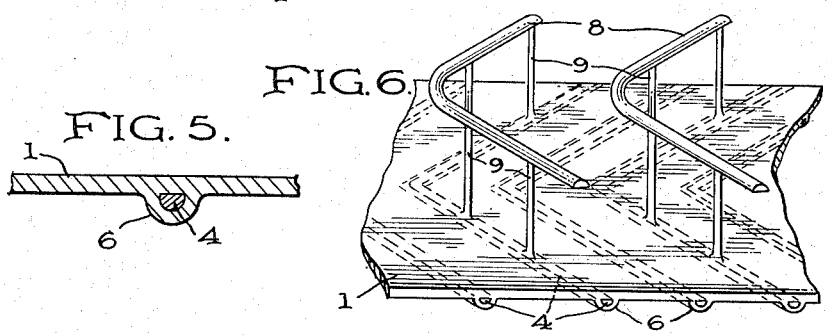
FIGURE 5 is a section on V—V in FIGURE 3.
FIGURE 6 is a perspective view of part of an escalator.

The fact that the belt may have stiffeners each formed by a rigid open frame, despite its flexibility, enables these stiffeners to be used for securing solid parts which thus move with the belt; plates, supports, buckets and so on. In particular, for belts intended to convey passengers, a hand rail may be fixed to a chevron-type frame to enable the passengers to hold on during ascent, descent and transport as shown in FIGURE 6. In this figure, reference 4 denotes a rigid stiffening chevron, reference 8 a hand rail element fixed to the stiffener 4 by lightweight legs 9. The assembly formed by the stiffener, hand rail and legs forms a semi-rigid element which as a result of the hyperboloid shape of the return rollers can turn without difficulty during the turning over of the belt. The hand rail may obviously have a shape other than that shown in the drawing.

The invention is naturally not limited to the details of the embodiments described hereinbefore, and they may be modified without thereby departing from the scope of the invention.

What I claim is:

Conveyor belt installation having a flexible belt, supporting rollers and driving rollers for the belt, and stiffeners for the belt extending obliquely with respect to the length of the belt with the distance between two successive ones of the rollers being less than the length of the belt over which a given one of the stiffeners extends, the improvement comprising end rollers for guiding the return of the belt, said end rollers having the form of a hyperboloid of revolution and the stiffeners being rectilinear and corresponding to the rectilinear generatrices of said hyperboloid of revolution of said end rollers.

References Cited by the Examiner
UNITED STATES PATENTS

| 325,129 | 8/85 | Stephens | 198—193 X |
|---|---|---|---|
| 874,982 | 12/07 | Norton | 198—198 |
| 983,669 | 2/11 | Beier | 198—187 X |
| 2,091,958 | 9/37 | Braga | 74—229 |
| 3,107,652 | 10/63 | Kitson | 198—181 X |

FOREIGN PATENTS 684,355 12/52 Great Britain.

SAMUEL F. COLEMAN, Primary Examiner.
EDWARD A. SROKA, Examiner.